(12) United States Patent  
Münter

(10) Patent No.: US 7,209,659 B2  
(45) Date of Patent: Apr. 24, 2007

(54) MODULAR HIGH CAPACITY NETWORK

(75) Inventor: Ernst A. Münter, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 493 days.

(21) Appl. No.: 09/739,277

(22) Filed: Dec. 19, 2000

(65) Prior Publication Data

US 2002/0075540 A1    Jun. 20, 2002

(51) Int. Cl.
   *H04J 14/00* (2006.01)
(52) U.S. Cl. .......................................... 398/49; 398/50
(58) Field of Classification Search ............ 398/48–50, 398/56, 45, 55, 47, 51, 54
   See application file for complete search history.

(56) References Cited

U.S. PATENT DOCUMENTS

| | | | |
|---|---|---|---|
| 4,470,139 A | | 9/1984 | Munter ........................ 370/66 |
| 5,168,492 A | | 12/1992 | Beshai et al. ............... 370/60.1 |
| 5,499,239 A | | 3/1996 | Munter ...................... 370/60.1 |
| 5,802,043 A | | 9/1998 | Skillen et al. ............... 370/258 |
| 6,519,062 B1 | * | 2/2003 | Yoo ............................. 398/49 |
| 6,643,463 B1 | * | 11/2003 | Suzuki et al. .................. 398/49 |
| 6,665,495 B1 | * | 12/2003 | Miles et al. ................... 398/54 |
| 7,054,559 B1 | * | 5/2006 | Le et al. ........................ 398/79 |
| 2003/0058797 A1 | * | 3/2003 | Izmailov et al. ............. 370/238 |

OTHER PUBLICATIONS

J. Elmirghani et al., "Technologies and Architectures for Scalable Dynamic Dense WDM Networks", IEEE Communication Magazine, Feb. 2000.*
A. Misawa et al., "WDM Knockout Switch with Multi-Output-Port Wavelength-Channel Selectors", Journal of Lightwave Technology, vol. 16, No. 12, Dec. 1998.*
E. Limal et al., "Building WDM Wide Area Resilient Transport Network from 4-node Semi-Mesh and Mesh Sub-networks", IEEE, 1997.*

* cited by examiner

*Primary Examiner*—Shi K. Li
(74) *Attorney, Agent, or Firm*—Jeffrey M. Measures; Borden Ladner Gervais LLP

(57) ABSTRACT

A high capacity network increases its capacity by adding switching modules at the core side. Network expansion is achieved by incrementally adding one plane of switches to each core node so as to form virtual parallel plane (VPP) networks, one wavelength to each VPP network to achieve full interconnection, and by making corresponding upgrades to WDM equipment at each point-of-presence (POP) switch. An optical distribution unit (ODU) is used to control the connectivity of the VPP networks. The expansion of the network capacity is performed without increasing the number of hops. By using wavelength multiplexing, several VPP networks, and logical traffic distribution, the present invention provides for a wide range of network capacities coverage and allows to dynamically reconfigure the connections to accommodate increased traffic demands.

15 Claims, 3 Drawing Sheets

MODULAR HIGH CAPACITY NETWORK

BACKGROUND OF THE INVENTION

1. Field of Invention

This invention relates to modular networks in general and in particular to high capacity modular networks.

2. Related Art

The exponential growth in available fiber transmission capacity is due to periodic large jumps in bit rates in the past, and the availability of higher densities of wavelength division multiplexing (WDM) more recently. The growth in number of subscribers, time spent on line, and types of interaction, contribute to a steady and rapid growth of traffic demand.

WDM, dense WDM (DWDM), and optical switching become more and more available. Presently, the terminal capabilities are not a limiting factor in bandwidth use. Conversely, the servers are a limiting factor for network growth but this appears to be more a cost issue than a technical limitation. In multi-node networks the traffic interconnectivity is engineered according to the observed or presumed traffic demand and the available infrastructure (transport) like point-to-point fiber and fiber rings. For increasing the network capacity, the existing switches may be expanded up to their maximal capacity, additional switches may be added, or the existing switches may be replaced with larger models.

A solution for collecting more traffic in a local area network (LAN) is to use multiple parallel SONET rings. However, this solution has to address the problem of balancing the traffic and the problem of fixed assignment of traffic sources to transport rings.

Other solutions to increase the capacity of the network may include replacing the existing switches with larger capacities switches, rather than using an increased number of switches at a node. This requires in most cases, switches with a capacity beyond the available switch capacity.

For increasing the capacity of an existing network, the link capacity can be increased by providing more wavelengths on more optical fibers. As a result, the equipment at the nodes must allow incremental equipment growth, in other words to be scalable. Changes in the network topology such as adding new backbone sites, or another direct route between two previously unconnected backbone nodes also require that the backbone, or core nodes to be scalable. The deployment of a new backbone node at a new site is a major challenge which is generally circumvented by upgrading the existing network.

Accordingly, there is a need for a scalable network architecture that allows both backbone nodes and network capacity to increase in a manner that avoids cost increases and lower efficiencies that would result from increasing network capacity by reshaping a conventional network topology by adding switches and more hops.

SUMMARY OF THE INVENTION

The present invention seeks to overcome the disadvantages of the prior art associated with increasing network capacity.

According to one aspect of the invention, a modular and scalable communication network is provided. The network comprises a plurality of access switches, each for transmitting data over an associated set of forward access wavelengths, an optical distribution unit (ODU) for receiving a plurality of sets of forward access wavelengths and redistributing the data over a plurality of forward core wavelengths, a plurality of core switches, each for receiving an associated set of forward core wavelengths from the optical distribution unit (ODU), and wherein the ODU is provided with a connectivity map to allow each of the access switches to communicate with each of the core switches using a predetermined bandwidth. The bandwidth is increased by adding switching modules at the core side, so as to create N virtual parallel plane (VPP) networks and modifying the connectivity map accordingly. The reverse transmission is also contemplated by the present scalable and modular network.

According to another aspect of the invention, a scalable communication network, for establishing full connectivity between a plurality of access networks/nodes, is provided The network comprises a plurality K of points of presence (POP) provided with access routers, each for consolidating data received from an access networks/nodes over a plurality of input access trunks, and a core network of a plurality N of virtual parallel plane (VPP) networks, each VPP network including means for routing traffic received over an input access trunk to a plurality (N−1) of associated core links for connecting a core node with a subset of the remaining core nodes of the scalable communication network.

According to a further aspect of the invention, a scalable core node for a transport network is provided. The node comprises a wavelength cross-connect with (M−1) input distribution ports and N×(M−1) output ports, each input distribution point for routing traffic received on an input link to a plurality N of the output ports according to a connectivity map, and a plurality N of switching modules $S_1$ to $S_N$, each connected to a plurality (M−1) of output ports. For expanding the network capacity, an additional switching module $S_{N+1}$, an additional input distribution point, and (M−1) additional output ports are added on the cross-connect for routing traffic received on the additional distribution point from each input link to (M−1) additional output ports, according to a supplementary connectivity map.

The present invention allows linear scaling of the existing network through the creation of virtual parallel plane (VPP) networks and a logical traffic distribution from access points to the VPP networks. The expansion of the network capacity is performed without increasing the number of hops. By using wavelength multiplexing, a wide range of network capacities are covered and the traffic demands can be dynamically accommodated.

Other aspects of the invention include combinations and subcombinations of the features described above.

BRIEF DESCRIPTION OF THE DRAWINGS

The invention will be now explained by way of example only and with reference to the following drawings.

Similar references are used in different figures to denote similar components

DETAILED DESCRIPTION OF THE PREFERRED EMBODIMENT

The following description is of a preferred embodiment by way of example only and without limitation to combination of features necessary for carrying the invention into effect.

Due to geographic and economic factors, the onus for increasing the network capacity is on the switching nodes. A switching node must provide enough capacity to accommodate vertical integration, e.g. all services on one network, and also horizontal integration, e.g. fewer larger networks with concentrated backbone switching sites.

The resulting architecture is based on two fundamental assumptions. Firstly, the network topology, in a geographic sense, does not change significantly in the short term. In other words, the number of backbone switches remains limited, and the fan-out of routes from any one center is fixed. Secondly, the capacity of fiber trunks, or links, may be increased primarily by addition of wavelengths, or as the bit rate increases beyond 10 Gbs per link.

Throughout the description "link" or "trunk" are interchangeably used and represent groups of bidirectional links for interconnecting the core nodes (core links) and for connecting core nodes and access nodes (trunks).

Figure 1:
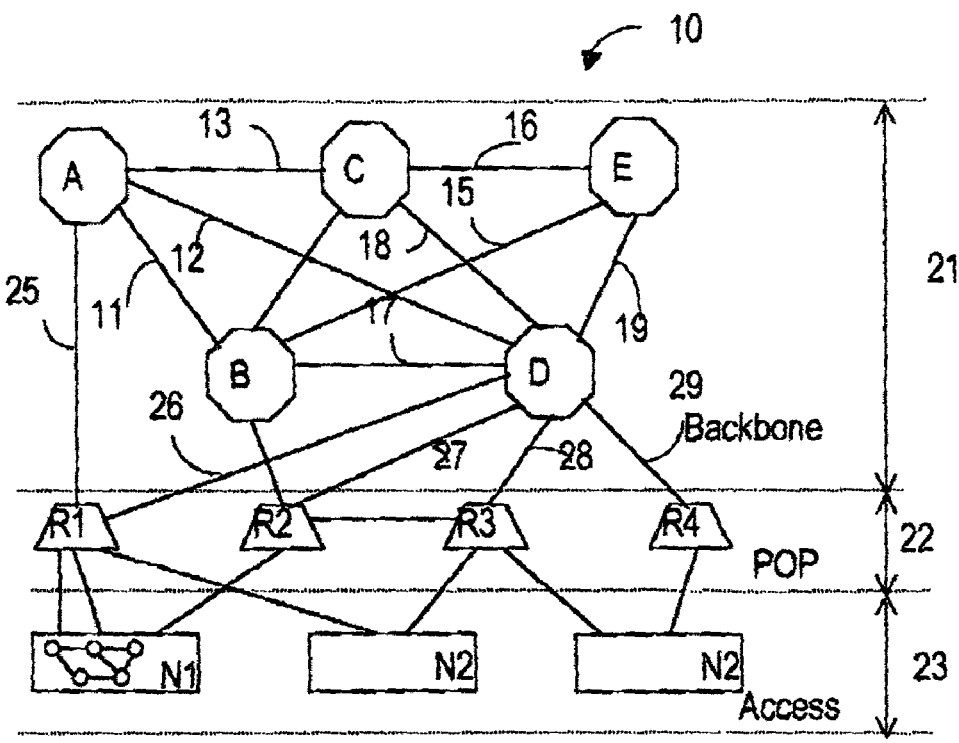
FIG. 1 illustrates a typical network hierarchy.

As illustrated in FIG. 1, network 10 consists of a three layer hierarchy, namely backbone layer 21, point-of-presence (POP) layer 22, and access layer 23. A set of tandem, or core nodes A, B, C, D, E, are included in the backbone layer 21. Edge nodes, or POP switches R1, R2, R3, R4, are included in POP layer 22, while access layer 23 includes various networks N1, N2, N3.

Core links 11 to 19 inter-connecting core nodes (CN) A to E, consist of any number of parallel serial links, typically 10 Gbs SONET, multiplexed on one or more physical fiber/s. Trunks 25 to 29 between concentrating POPs and the backbone layer 21 are also WDM links, or connections like for example 1 G local or 10 G Ethernet. Core nodes A to E are large size switches, while the edge nodes, or POP switches R1 to R4 funnel the data packets into the backbone layer 21.

Figure 2:
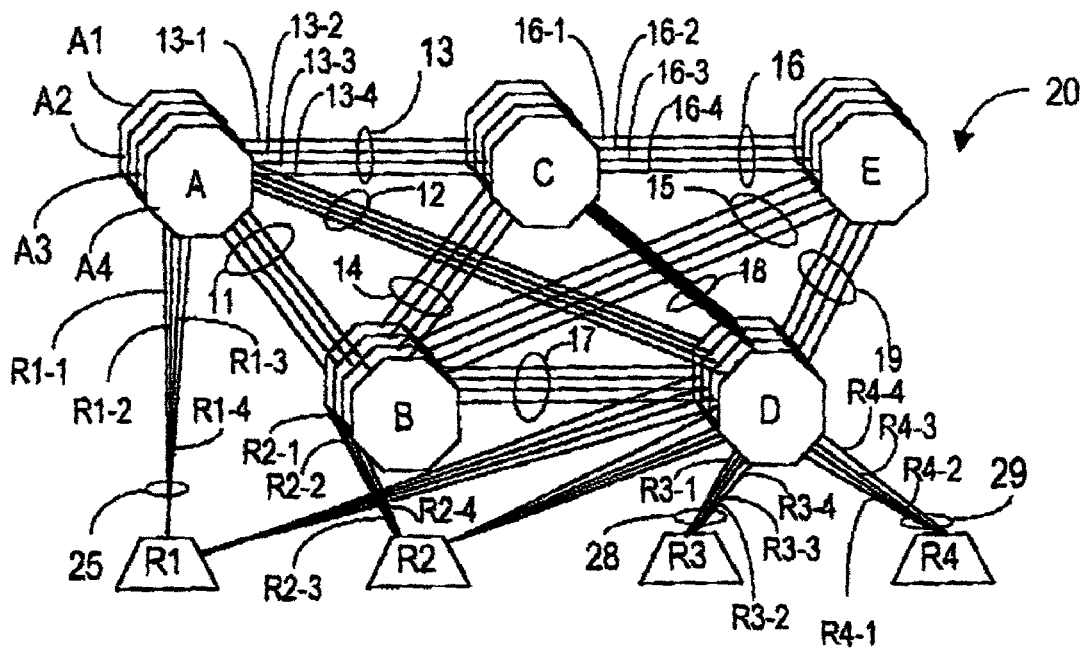
FIG. 2 illustrates virtual parallel plane (VPP) networks formed at the backbone layer according to the invention.

Each core node A, B, C, D or E, constitutes a physical entity which can not scale up indefinitely. Advantageously, using WDM, multiple parallel switching planes can be created for increasing the node capacity. An optical cross connect (OXC) may be used to control the connectivity of the parallel switching planes, According to one embodiment of the invention and as shown in FIG. 2, network 20 may be considered a set of overlaid identical networks, comprising for example identical overlaid nodes A1, A2, A3, A4 at the expanded node A, which are accessed by the POP layer 22 through a number of connections R1-1, R1-2, R1-3, R1-4 forming trunk 25. Connections R1-1, R1-2, R1-3, R1-4 have the same capacity, and their number is equal to the number of overlaid nodes created at the core node A.

The growth of network 20 is therefore accomplished by adding slices of parallel networks with fixed capacity, or virtual parallel plane (VPP) networks VPP-1, VPP-2, VPP-3, VPP-4. Each VPP network includes overlaid nodes, e.g. A1, B1, C1, D1 in VPP-1; A2, B2, C2, D2 in VPP-2; and so on. Additional connections to the edge nodes R1, R2, R3, R4 are also included in VPP-1, eg. R1-1 connecting R1 to A1, R2-1 connecting R2 to B1, R3-1 connecting R3 to D1, and R4-1 connecting R4 to D1.

Creating "N" VPP network implies physically adding N ports to each core node A to E, and the same number N of wavelengths on all connecting fibers. For the example of FIG. 2 where N=4, four links 13-1 to 13-4 forming core link 13 are provided between nodes A and C, and four connections R3-1 to R3-4 forming trunk 28 are provided between access node R3 and node D. These connections are managed by zero, one, or more optical cross connects OXCs (not shown).

The capacities, or the bitrates, of each core link 11-19 do not have to be equal, and can vary according to a local need, or following variable demands. The number of serial links forming each core link 11-19, and the number of connections forming each trunk 25 to 29 is the same, or N, across a particular VPP network. Links 13-1 to 13-4, or connections R3-1 to R3-4 for example, have the same capacity and are controlled by the OXC (not shown).

The following description is made with reference to a symmetrical and fully interconnected core node D, for simplicity. It is to be understood that full symmetry is not a requirement as long as the connections between the core and the access nodes are logically distributed and a striping algorithm takes into account the actual link capacities.

Figure 3:
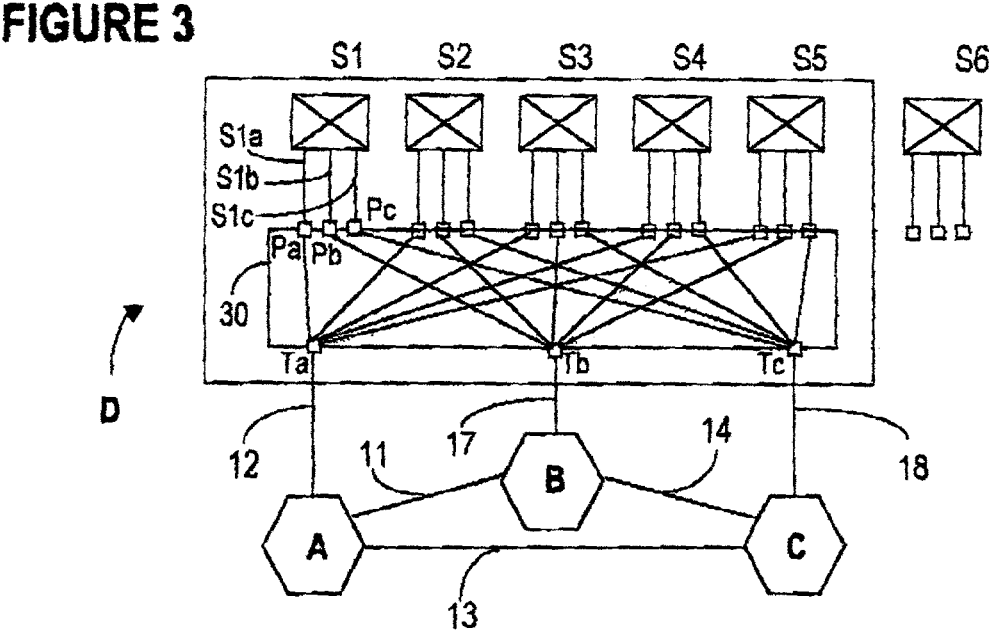
FIG. 3 illustrates the interconnection of the VPP networks of FIG. 2.

FIG. 3 illustrates how core nodes A, B, C, are connected to an expanded core node D within backbone network 21. Node D comprises multiple parallel switches, N=5 in this example, and the same number (N) of switching modules S1–S5 located in five virtual parallel planes VPP-1, VPP-2, . . . , VPP-5. Core nodes A, B, and C are connected to each other, with five wavelengths multiplexed on core links 11, 13, 14. For connecting core nodes A, B and C, to core node D, each switch S1 to SS has three ports, each port for connection to one core node A, B, and C. Optical cross connect (OXC), or optical switch 30, connects core nodes A, B and C to switches S1 to S5. For example, node A is connected to switch S1 at distribution point Pa through bi-directional link S1$a$; node B is connected to switch S1 at distribution point Pb through bi-directional link S1$b$; node C is connected to switch S1 at distribution point Pc through bi-directional link S1$c$.

In the example of FIG. 3, each switching module S1 to S5 has the same routing capabilities. The capacity of the expanded node D is thus increased five times compared to the capacity of a single switch Si. The input ports, or the port fan-in of each switch is three, i.e. ports (Pa, Pb, Pc), whose number is the same as the number of core links 12, 17, 18 connected to the OXC 30 at distribution points Ta, Tb, Tc.

Suppose that the traffic demand on link 12 increases and exceeds the design capacity of the core switch D and therefore, node D has to be expanded. The capacity of core node D can be increased either by addition of ports as it is well known in the art, or by addition of switches.

To expand the capacity of the core node D by addition of ports while maintaining the same fanout, i.e. a node D is directly connected to nodes A, B, C, in backbone layer 21, one port is added to each switch S1–S5, and five wavelengths are added to core link 12 without modifying core links 17 or 18. It is understood that likewise each core link 12, 17, and/or 18 can be so expanded to meet the traffic requirements, while the number of ports on each switch S1–S5 is increased accordingly.

The capacity of node D can be also increased by adding another switching module S6 at any given time. i.e. when the port capacity of the switches S1 to S5 is exhausted. Addition of switches has to be performed in the network configuration context, as it affects POP switches R1 to R4 and the corresponding core nodes, and must rely on the OXC 30 capability to reconfigure the network.

Switch S6 is placed in a newly created virtual parallel plane network VPP-6. SWitch S6 also has three ports for connecting to core nodes A, B and C, while six bi-directional links are now needed at the distribution points Ta, Tb, Tc, respectively, to re-distribute the routing over six switches S1 to S6. If the hardware permits, parallel switches S1 to S6, may share a single fabric and appear as a single switch.

It is possible that, the total number of discrete wavelengths (X) used on a link, may be divisible by N (five here) but not by (N+1). This is not a concern when the links are re-distributed by the OXC 30 because symmetry of the system is not required.

Core nodes A, B, C, as well as POP switches R1 to R4, are immediately informed that the number of planes in the VPP network has increased to (N+1). POP switches R1 to R4 are also rearranged in (N+1) planes to distribute their traffic accordingly.

Figure 4:
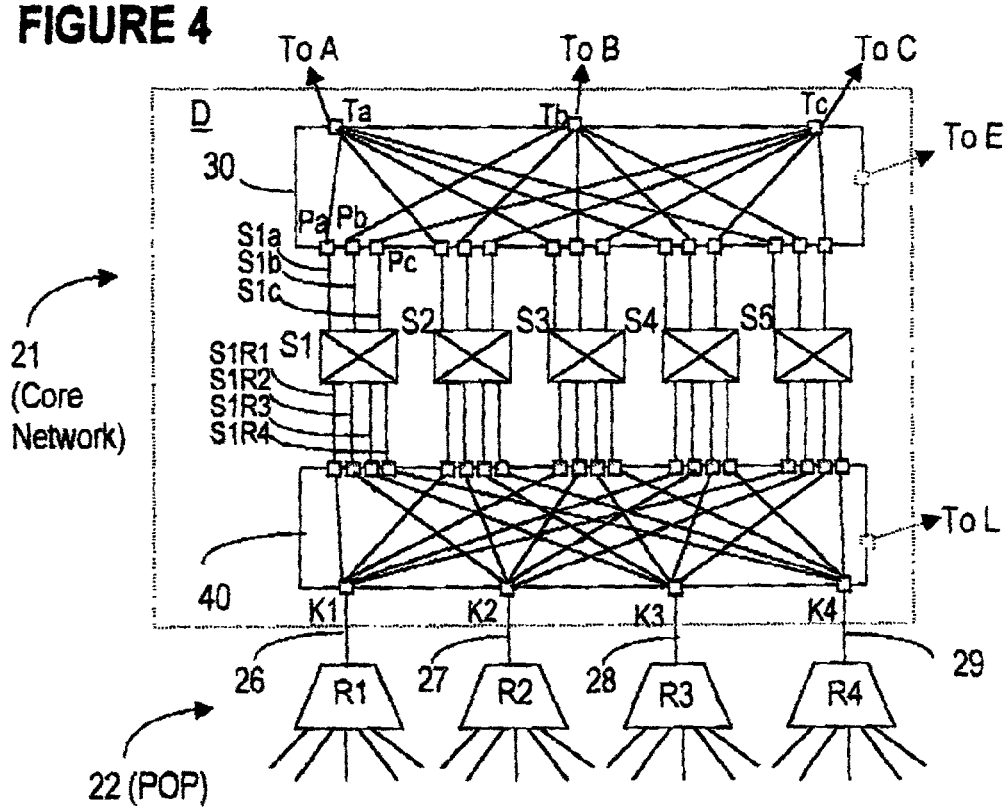
FIG. 4 illustrates the interconnection between access nodes and the VPP networks of FIG. 3.

FIG. 4 illustrates core node D having five VPP networks connected to four POP switches R1 to R4 through trunks 26–29. To connect POP switches R1 to R4 to the core node D, an optical cross connect (OXC) 40 is used on the access side of node D. Modular switches S1 to S5 should have four, or multiple of four access ports, to connect to four POP switches R1 to R4 through bi-directional trunks 26–29, while distribution points K1 to K4 on OXC 40 should be each provided with five bi-directional links to switches D1 to S5. For example, switch S1 is connected to POP switches R1 to R4 through four bi-directional port links, or individual optically switchable S-color connections S1R1, S1R2, S1R3, and S1R4.

Each logical port link S1R1 practically includes a "bundle" of wavelength links which in fact is a bundle of ports. The links may have different capacity as long as the un-symmetry, or the imbalance is taken into account. This is done by a load balancing algorithm, as known in the art.

We now introduce the term "order" to define the number of parallel switching planes, or VPP networks. The order of the network 20 is N, where N is the number of modular switches S1 to SN at each expanded core node site. The number of available S-color links in each core link 11, 12, 13, 14, 17, 18 is calculated according to the equation:

$$\text{number of } S\text{-colors} = N \times m \qquad \text{EQ1}$$

where "m" is an expansion factor. The capacity of individual core links 11, 12, 13, 14, 17, 18 can be adjusted over a wide range by equipping serial links at different rates (2.5 or 10 Gbps), and by running "m" multiple bundles.

In general, each parallel switch S1 to S5 has a number of ports calculated according to the equation:

$$\text{number of ports} \geq K + (M-1) \qquad \text{EQ2}$$

where "K" is the number of POP switches directly connected to that node, "M" is the number of core nodes, and (M−1) is the number of core nodes (here A, B, and C) directly connected to the respective node (here node D). In the example of FIG. 4, the number of ports required at each parallel switch S1 to S5 for full backbone connectivity is 4+(4−1)=7.

If a fifth node E is to be added to the fully connected core nodes A to D, one additional port is needed at each modular switch S1 to S5 in node D. and one additional S-color link, e.g. S1e (not shown), is need to preserve full core nodes connectivity.

It is to be noted that a network with a single core node (M=1) with N parallel switching planes and any number K of access nodes, is also a valid solution as contemplated by the invention.

Similarly, if another POP switch L needs to be added at node D, node L has to be connected to each individual switch S1 to S5 through an additional S-color link which is split up in the optical switch 40.

The number of POP switches "K" can vary, but each POP switch Ri is connected to a core node A to D with N optically switchable links, possibly at different bit rates. The capacity of the modular switches Si may be different at different sites, and the total capacity of a core node, or the site capacity (Cs) is calculated according to the equation:

$$Cs \geq Cpop + Ccl \qquad \text{EQ3}$$

where Cpop is the capacity required for all incoming POP traffic, and Ccl is the sum of the used capacities of all core links at that site.

The network topology includes N parallel backbone networks of equal, or different capacities. Each POP switch Ri has equal access to all N parallel backbone networks, but different access values may be also considered. Routing across each parallel backbone network operates equally, i.e. each core node A to D is considered a single router, and the forwarding tables in each of the modular switches Si that make up a core node A to D are identical. Traffic is split evenly and nondiscriminatory at each POP switch Ri to access all N parallel backbone networks equally, for example based on a striping algorithm designed to balance the traffic while preserving flow packet order. The striping algorithm needs to take into account the actual link capacities in the case where full symmetry is not required, e g. different link and node capacities in different VPP networks.

The traffic may be also segregated on some of the N parallel backbone networks according to the required class of service (CoS), or other criteria for protecting a type of traffic. Simple equal access is favored if there are no compelling reasons to differentiate.

Network Expansion Example

Assume that a modular switch has a capacity of up to 400 ports, up to 10 Gbps (Giga bits per second) each, or 4 Tbps (Terra bits per second) in total, and that the same switch capacity is available to build either backbone switches in layer 21, or POP switches in layer 22.

The 400-port limit restricts the fanout, i.e. the size of the topology, in a fully connected network to about 200 core node sites, as the same capacity (½ of the port capacity) is reserved for POP switch access. Similarly, the order N of the network, or the number of virtual parallel planes (VPPs), is limited by the POP switch fanout, at the lowest port rate, e.g. N=200, 800, or 1600, with OC48, OC192, and Gnet connectivity, respectively.

Suppose that the backbone network 21 consists of 26 fully meshed core nodes of equal capacity, with 10 Gbps per link, and that the number N of VPP networks, is arbitrarily chosen to start at 20 (N≦20). Hence the minimum required capacity of a core link is 200 Gbps.

Each core node has 20 real, or virtual switches Si, each switch having at least 200 Gbps of port capacity dedicated to the backbone network. In a maximum node configuration, each switch is a real switch with 4 Tbs overall capacity, or (200×20 :2=2 Tbps) 2 Tbps on the backbone side and 2 Tbps on the POP side. This results in 80 Tbps switching capacity in the 20 modular switches at such a site (20 switches×4 Tbps). In symmetrical networks, this value is divided by two to find out the maximum backbone capacity (80/2=Ccl=Cpop=Cmax=40 Tbps).

For a 26 node configuration with 20 switching modules per node (N=20), a core node needs to provide 200 Gbps of trunking capacity to each of the other 25 network peers (5 Tbps in total), plus POP access capacity, e.g. Ccl=Cpop=5 Tbps. Now, 10 Tbps of switching capacity can be provided with 2.5 real 4 Tbs modular switches, divided along groups of ports into 20 virtual switches S1 to S20.

At the core site, a symmetrical and fully connected backbone network is provided with core links ranging from a minimum of 200 Gbps to about (80/2:25=) 1.6 Tbps maximum, or site capacity on the network side Cs=[between 5 and 40 Tbps] divided by 25 backbone core links.

At the POP site the network can be now expanded from 5 Tbps to 40 Tbps. This order-20 network as a whole, can thus grow from a minimum node capacity of 130 Tbps calculated by multiplying 5 Tbps×26 core nodes×200 Gbps/link, to a maximum node capacity of 2,080 Tbps=2 Pbps ) Peta bits per second) calculated by multiplying 40 Tbps×26 core nodes×200 Gbps/link. (1 P=1000 T and 1 T=1000 G). Accordingly, the maximum node or POP capacity growth is from 130 Tpbs to about 1 Pbps, just by adding ports and wavelengths in the backbone. All POP switches, existing and expansion, have 20 links for connection to their assigned core nodes.

Growth beyond 1 Pbps maximum capacity requires an increase in the order of the network beyond the current N=20. It requires additional backbone switching facilities and ports, but it also requires additional links from every POP switch participating in the expansion process, Using the same technology, i.e. identical 4 Tbps switching modules and a 26-node backbone with 10 G links to POPs, the maximum (hypothetical) network increase which can be considered is N=200, or a 100 Pbps network capacity. This limit is set by the fanout of the POP switches which can access 200 parallel backbone networks to the maximum, in this example.

At the other extreme, the smallest such 26-node networks, of order-1 (N=1) could grow in capacity from a minimum of [(5×26):200=]0.650 Tbps to a maximum of [(40×26):200=] 52 Tbps, depending on the number of ports and backbone trunk group equipment. In such a network, each core node contains a single switch module, and a POP switch has one link to its assigned backbone switch.

Figure 5:
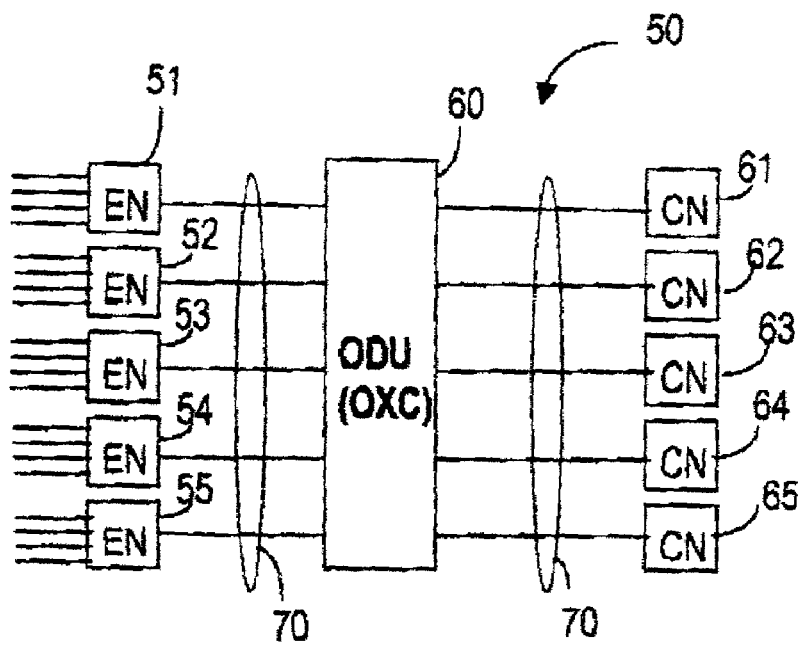
FIG. 5 illustrates traffic distribution in an optical network using an optical distribution unit (ODU), according to the invention.

FIG. 5 illustrates a metro access optical network 50, connecting edge nodes (EN), or access nodes 51–55 to the core nodes (CN) 61–65. Edge nodes 51–55 and five core nodes 61–65 are connected with single multi-wavelength fiber links 70 over an optical distribution unit (ODU), or cross connect (OXC), or optical switch 60. In the context of the optical network 50, edge nodes 51–55 and core nodes 61–65 are to be understood as the user access nodes and the tandem nodes, respectively.

Unlike conventional networks, which are based on a backbone of several fully interconnected core nodes, optical network 50 has a set of core nodes 61–65 which are only connected to edge nodes 51–65, but not to each other. Same convergence is achieved with less routing complexity even when the core nodes are not fully meshed, as in the example FIG. 5.

Each node has N logical links which are wavelength multiplexed onto the single fiber 70. Each node uses the same set of wavelengths, and the function of the optical distribution unit (ODU) 70 is to demultiplex the wavelengths and re-arrange them such that each edge node 51–55 is connected to each core node 61–65. It is understood that the same effect may be achieved without multi-wavelength fibers, by simply connecting each edge node 51–55 to each core node 61–65 in the traditional full shuffle arrangement. The flexibility of the optical distribution unit (ODU) 60 connecting the edge nodes 61–65 to the core nodes 61–65 provides network expansion possibilities and traffic sensitive reconfiguration.

An advantage of the new topology is the ability to combine the simplicity of single-hop routing with virtually unlimited capacity growth, Without the need of continuously introducing larger switches. By adding the required number of single size switching modules at the core nodes, and re-arranging the optical connectivity accordingly, a wide range of network capacities can be covered.

Nevertheless, larger switches as they become available may be seamlessly integrated at any time, as a mixed network configuration is entirely acceptable.

Optical network 50 in the example of FIG. 5 may be considered a geographically distributed rotator switch similar to the rotator with forwarder cards described in U.S. Pat. No. 5,168,492, issued on Dec. 1, 1992, and assigned to the same assignee (hereinafter the "rotator architecture").

In the rotator architecture, a switch with "m" inlets and "n" outlets is achieved by adding "p" intermediate packet buffers each having "n" slots. Two rotators are used between the inlets and the buffers (or tandem memories) and between the buffers and the outlets, respectively. The rotation is based on the time slots defining the ATM cells coming through the inlet switch. The packets are segmented into fixed size cells, systematically delivered from the edge nodes (forwarder modules) to the tandem buffers in a round robin manner. A scheduler ensures that each tandem buffer receives only one cell per rotation cycle for each destination edge node. Each output is once connected during one rotation, and there is no contention on the output. This allows the tandem buffer to always deliver all received traffic within a single rotation cycle. There is only one storage location per tandem, per outlet, and commutation is fixed and cyclic such that all nodes are in synchronism.

The rotator architecture was designed for obtaining larger switches from lower-capacity modules interconnected by fiber. Specifically, each core node is a module, or a physical unit connected to the rotator by one fiber Optical network 50 may for example use standard Ethernet, Internet Protocol (IP), multi-protocol label switching (MPLS) packets which are not of a fixed size as the cells in the rotator architecture. As well, network 50 does not require all nodes to be of equal size and has no central scheduler. The rotation function is shared between all nodes and the optical cross connect (OXC) 60, which statistically distributes wavelength assignments (rather than individual packets) according to a connectivity map. The commutation function of tne rotator architecture is emulated by the striping algorithm which balances the traffic over the core nodes 61–65.

The capacity of the core nodes is distributed among all wavelengths, giving each POP switch guaranteed access to a preestablished fraction of the core node's capacity.

Using a single fiber 70 for access node connection, a single fiber for core node connection, and multiple wavelengths on the fiber 70, the required full connectivity is achieved. In this way, the optical network 50 as a whole, with its ability to provide color-based connectivty, replaces the rotator architecture function without actually rotating.

For example, using wavelength conversion in the optical network 50, with N colors (say, 0, 1 . . . , 7) it is possible to connect N backbone switches to ODU 60 with one fiber 70 per access switch. Each color is associated with a particular core node on the access side, and each color also identifies an access switch on the core side. The optical network 50 rotates the colors so that all colors from 1 to N from different access nodes 51–55 connecting to core node 61 are converted to another set of colors so they can arrive at node 61 on a single fiber, the arriving color representing an access node identity.

If wavelength conversion is available, each VPP network is identified with one color from the edge nodes 51–55, and each edge node 51–55 is identified with another color as seen from the core nodes 61–65. This implies that one color has different meanings at the edge side and the core side of the OXC for performing the wavelength conversion. Pure optical technology for wavelength conversion is not presently available and the conversion has to be performed by optical-to electrical decoding of the first color, and re-modulating on a new color.

Due to the cost of the optical-to-electrical and back conversion, the rotation of colors may be achieved by rotating the assignment at the core nodes (CN) 61–65. Suppose N=8, and colors ranging from 0 to 7 in an optical network with 8 core nodes indexed using $k \in [0-7]$, and 8 access, or edge nodes indexed using $j \in [0-7]$. To access a core node "k" from a POP switch "j", color "x" is used and is calculated with the equation:

$$x = (j+k) \bmod N \qquad \text{EQ4}$$

In this way, each access node 51–65 is connected to each tandem node 61–65, and every node is connected by a single fiber, each fiber carrying 8 wavelengths. No wavelength conversion is needed.

The function of the ODU 60 is simply to connect the appropriate colors to corresponding nodes. The ODU 60 has capabilities to split wavelengths from each fiber, to switch the single color signals, and to recombine them on the output.

While the optical distribution unit (ODU) 60 has similar topology and purpose as the rotator in the rotator architecture, it also has a different detailed operation compared to the rotator. For example and similarly to the rotator, the optical network 50 can be distributed and made from multiple smaller units. On the other hand, the optical connections are static, only to be updated when new switches are added, or the capacity of the switch is increased. Also, there is no absolute need to use a single fiber 70. Multiple fibers are possible, and any mix, including fibers with a single wavelength can be arranged to serve the purpose.

The rotation among switches is not necessarily based on a fixed cycle, and may also be more arbitrary, for example derived from the IP source and the destination addresses. The whole network acts as "the switch", which means that the individual nodes may have different sizes, links may have different capacities, and the topology is not necessarily as completely symmetrical as the classical rotator switch architecture would require.

Unlike the fixed packet size rotator architecture of the above identified patent, in the network-is-the-fabric system 50 of the invention, packets are not segmented, but transmitted as ordinary packets, e.g. Ethernet encapsulated. A not so rigid, non-synchronous rotation scheme is used, basically similar to what is frequently described as striping. All packets sent from an edge node 51–55 towards the core nodes 61–65 are systematically distributed over all links. The rotation scheme recognizes the need to prevent packet misordering keeping flows within a certain time window on a single path, and balancing the traffic as much as practical, in order to assure the highest occupancy (load factor), for individual links so as to increase efficiency. Adequate striping without flow recognition can be achieved by using extra header information for example.

Because striping of the different edge nodes is unsynchronized, there is no guarantee that a core node 61–65 will not simultaneously receive multiple packets for the same output edge destination. Network 50 needs very little traffic management and consequently, the core nodes have to accept and buffer more than one packet per output port, due to the variable length of the packets. For example, the variable intensity of the packets may be due to an imperfect striping scheme, e.g. round robin, which adds to the statistical variation and requires core buffering.

Unlike the rotator architecture, which only provides a single buffer space per destination in the tandem node, the core nodes 61–65 require queues with the ability to store multiple packets. This is due to the absence of a global scheduler. As all edge nodes 51–55 deliver packets to the core nodes 61–65 without mutual coordination, the arrival of multiple packets to be forwarded to the same output edge node 51–55 can not be avoided. Therefore, these packets are queued.

For equal access and trunk capacities, packets arriving at the access nodes 51–55 can be forwarded on the next available core link. This requires only small buffering capability in a direction towards the core. However, the reverse traffic coming from the core to the edge switches 51–55 needs conventional egress queues, possibly with the ability to discard traffic, in order to deal with the statistical variation of traffic directed towards each individual access output. Overall traffic management is used to minimize such occurrences, for example by policing at ingress and by setting up controlled quality of service (QoS) paths in MPLS environments. In general, for regular "best effort" data traffic using IP and Ethernet, the traffic focusing at the output can not be avoided and must be resolved appropriately, as it is well known in the art.

There is one port in the optical distribution unit (ODU) 60 for each access node 51–55 and the reverse transmission from the core nodes to the output edge nodes is performed in parallel, on all ports simultaneously and is not serialized. However the net effect is the same: the capacity of the core node is divided by the number of ports, or colors if all on one fiber. A core node 61–65 requires more than a single packet buffer per destination. It is likely however, that the queues in the core nodes will be short depending on the quality of the edge node distribution algorithm, and the trunk dilation factor (if any).

Irrespective of how many other networks may access the optical network 50, the invention can be implemented using gateway routers that have access to all core nodes 61–65 on an equal basis. This makes them equivalent to edge nodes 51–55, and no traffic distortion can occur. In another implementation, internetwork access may be provided through selected core nodes only. This requires edge nodes 51–55 to have the capability to distinguish such offnet addresses, and use the designated core nodes 61–65 as gateway routers to specific networks.

The implementations described above can be used simultaneously. Fully connected gateway routers are appropriate where the traffic volume warrants piggy-backing a gateway on one or two core nodes 61–65 only and are recommendable in situations where the traffic volume is low and consequently, the distortion of the striping traffic balance is also low.

The optical network 50 is available for reconfiguring the peering and backbone connections as well. In reality, it is unlikely that all nodes are exactly of the same size, and that enough wavelengths are available to always use a single fiber per node. The network architecture shown in FIG. 5 is an example of a minimal system. Unlike the rotator architecture, the nodes in network 60 are regular buffered packet switches. Different capacity nodes, not necessarily equal, and links can be freely mixed as long as each edge node 51–55 has access to all core nodes 61–65, and the capacity between the nodes is factored into the striping algorithm.

It is also possible to avoid the absolute need for full connectivity of all edge nodes 51–55 to all core nodes 61–65, but sufficient core capacity between paired access and core nodes is required. Network 50 appears to be a modular (with blocks) network that requires no specific traffic engineering. The optical network control (ONC) function provides traffic engineering using optical cross connects (OXCs), and including taking advantages of daytime variations of the traffic flow.

Figure 6:
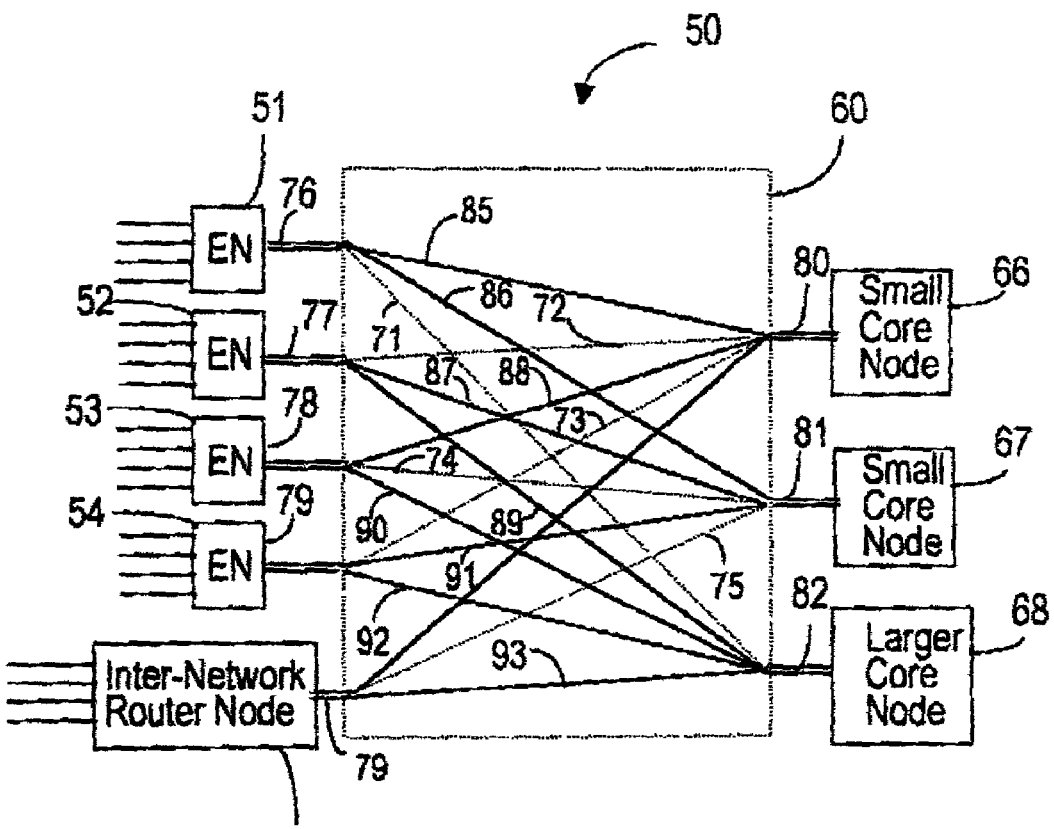
FIG. 6 is a more detailed illustration of the ODU of FIG. 5.

FIG. 6 is a different illustration of the OXC 60 of the network 50. Edge nodes 51–54 and core nodes 61–65 may be of a different capacities, and use different link speeds, such as 1 GE or 10 GE. In order to achieve the splitting in terms of "colors", optical switch 60 is inserted on bi-directional links 76–83 between access switches, or edge nodes 51–54 and core nodes 66, 67, 68. Optical switch 60 may include bidirectional links 71–75 and 85–93. Node 58 behaves as an edge node (EN) with the amendment that this node is part of the backbone layer 21. As illustrated in FIG. 6, even without dotted links 71–75 the full connectivity (reachability) of network 50 is still maintained. In addition if the core is comprised of small nodes 66, 67, the known [1:N] redundancy may be used, thus reducing the need for ultra reliable and costly core nodes.

The expansion of network 50 may be implemented without adding larger switches. Instead, the core nodes 66, 67, 68, may be divided into N virtual parallel planes (VPP) networks, where each plane corresponds to a wavelength, "color", or other optical attribute based on which an optical signal can be split up.

The edge nodes 51–54 may be connected to the core nodes 66, 67, 68, either directly in a NO-colors system, or using WDM/DWDM. In real networks a hybrid system is used. In a NO-colors case, each edge node 51–54 and each core node 66, 67, 68, has N ports with bi-directional links, and each edge nodes 51–54 is connected to each core nodes 66, 67, 68 with one fiber pair.

For WDM connection, suppose each core node 66, 67, 68, in the optical network 50 contains (N×N) ports, each port carrying N wavelengths. Inside the OXC 60, there are N switching planes, one for each wavelength, and each switching plane is an (N×N) single-wavelength switch. Each incoming fiber is split using a filter or a splitter, into N optical signals, each signal being assigned a different color, and is routed to an input of one of the N virtual parallel plane (VPP) network having the same color. For example, if color 3 on port-5 is connected to input 5 of switching plane VPP-3, it follows that color 4 from port-5 connects to input 5 of VPP-4, and so on, A second optical switch carries the return, or reverse traffic.

The outputs from the VPP networks are combined in optical combiners (not shown) or just superimposed, without using any filter. For example, the outputs numbered as "5" of all VPPs combine into a multi-lambda signal that exits port-5. Each colored VPP network receives only signals of the same color, such that the signal that exits port-5 is the combination of the signals switched by all the modular switches forming the VPP-5. As mentioned before, the setup of this switch can be rather static and follows the rules established by EQ4.

It may be possible to extend the invention for core-to-core cross connections. and to re-organize the traffic according to a multi-hop network.

The capacity of a network is increased by incrementally adding one plane of switches to each core node so as to form virtual parallel plane (VPP) networks. One additional wavelength is also added to each VPP network to achieve full interconnection. Corresponding upgrades to WDM equipment at each point-of-presence (POP) switch are made. An optical distribution unit (ODU) is used to control the connectivity of the parallel switching planes. All packets sent from an edge node towards the core nodes are systematically distributed over all links according to a rotation scheme. The rotation scheme recognizes the need to prevent packet misordering and balancing the traffic as much as practical, in order to assure the highest occupancy (load factor) for individual links, so as to increase efficiency.

The expansion of the network capacity is performed without increasing the number of hops. By using wavelength multiplexing, several VPP networks made of same size switching modules, and logical traffic distribution, the present invention provides for a wide range of network capacities coverage to dynamically accommodate variable traffic demands.

Embodiments of the present network architecture provide high scalability such as for exam* backbone growth from under 1 Tbps to 100 Pbps, or a range of 1:160,000 with a simple technology based on fixed 4 Tbps switching modules, with optical transmission at 10 Gbps per link, and optical cross connect (OXC) capability. It is recommendable that at least two VPP networks are maintained at two separate locations for safety reasons.

Numerous modifications, variations, and adaptations may be made to the particular embodiments of the invention without departing from the scope of the invention which is defined in the claims.

The invention claimed is:

1. A scalable communication network for establishing full connectivity between a plurality of points of presence (POP), comprising:
   a plurality K of access routers, each for consolidating data received from one or more access networks/nodes over a plurality of trunks, said access router being a packet router;
   a transport network of a plurality M of core nodes, each core node connected to the remaining (M−1) of said core nodes by (M−1) core links, and connected with an access router via one of said trunks, each said core node including:
   an optical cross-connect with a connectivity map for connecting (M−1) points and N×(M−1) ports bi-directionally, each point communicating with a respective trunk; and
   a plurality N of switching modules $S_1$ to $S_N$, each connected to a plurality (M−1) of said ports, said optical cross-connect and said core nodes forming plurality N of virtual parallel plane (VPP) network.

2. A scalable communication network as in claim 1, further comprising: an additional switching module $S_{N+1}$;
   an additional input distribution point, and
   (M−1) additional output ports on said cross-connect for routing traffic received on said additional distribution point from each said trunk to said (M−1) additional output ports, according to a supplement connectivity map.

3. A scalable communication network as in claim 2, wherein said trunk comprises N multiplexed wavelength connections and each said core links comprises N multiplexed wavelength serial links.

4. A scalable communication network as in claim 3, wherein said serial links and said connections are of equal capacity and support the same bitrate.

5. A scalable communication network as in claim 1, wherein said core links and said trunks have different capacities as required by the traffic demands.

6. A scalable communication network as in claim 1, wherein said switching modules have an equal routing capacity.

7. A scalable communication network as in claim 1, wherein said switching modules have a number of ports which is greater or equal to (K+M−1).

8. A scalable communication network as in claim 1, wherein each VPP network includes an optical switch for routing traffic received over an input access trunk to a plurality (M−1) of associated core links for connecting a core node with a subset of the remaining core nodes of said scalable communication network.

9. A scalable communication network as claimed in claim 8, wherein said core network further comprises an additional virtual parallel plane (VPP) network for incremental increase of the bandwidth of said core network.

10. A scalable communication network as claimed in claim 8, wherein the traffic is split at each of said access routers to equally access said N virtual parallel plane (VPP) networks.

11. A scalable communication network for establishing full connectivity between a plurality of access networks/nodes, comprising:
  a plurality K of points of presence (POP) provided with access routers, each for consolidating data received from an access networks/nodes over a plurality of input access trunks, each of said access routers being a packet router; and
  a core network of plurality N of virtual parallel plane (VPP) networks, each VPP network including means for routing traffic received over an input access trunk; said core network comprising:
  a single core node,
  an optical cross-connect with a connectivity map for connecting K points and N×K ports by-directionally, each point communicating with a respective access router; and
  a plurality N of switching modules $S_1$ to $S_N$, each connected to a plurality K of said ports.

12. A scalable communication network as claimed in claim 8 wherein said means for routing traffic comprises means for routing packets and wherein each switching module being a router.

13. A scalable communication network for establishing full connectivity between a plurality of points of presence (POP), comprising:
  a plurality K of access routers, each for consolidating data received from one or more access networks/nodes over a plurality K of trunks, said access router being a packet router; a transport network of a plurality M of core nodes, each core node connected to the remaining (M−1) of said core nodes by (M−1) core links, and connected with an access router via one of said trunks, each said core node including:
  a first optical cross-connect with a connectivity map for connecting M−1 first points and N×(M−1) first ports bi-directionally, each first point communicating with a respective core link; a second optical cross-connect with a connectivity map for connecting K second points and N×K second ports bi-directionally, each second point communicating with a respective second trunk; and
  a plurality N of switching modules $S_1$ to $S_N$, each connected to a plurality M−1 of said first ports and to a plurality K of said second ports, said switching module being a packet router.

14. A scalable communication network for establishing full connectivity between a plurality of points of presence (POP), comprising:
  a plurality K of access routers, each for consolidating data received from one or more access networks/nodes over a plurality K of trunks, said access router being a packet router; a transport network of a plurality M of core nodes, each core node connected to the remaining (M−1) of said core nodes by (M−1) core links, and connected with an access router via one of said trunks, each said core node including:
  an optical cross-connect with a connectivity map for connecting K+M−1 points and N×(K+M−1) ports bidirectionally, a plurality M−1 of the points communicating with a respective core link, and a plurality K of the points communicating with a respective trunk; and
  a plurality N of switching modules $S_1$ to $S_N$, each connected to a plurality M−1 of said first ports and to a plurality K of said second ports, said switching module being a packet router.

15. A scalable communication network for establishing full connectivity between a plurality of access networks/nodes, comprising:
  a plurality K of points of presence (POP) provided with access routers, each for consolidating data received from one or more access networks/nodes over a plurality K of trunks, said access router being a packet router;
  a core network of a plurality N of virtual parallel plane (VPP) networks, each VPP network including means for routing packets received over said trunk, said core network comprising a plurality of M core nodes, each said core node including:
  an optical cross-connect with a connectivity map for connecting K points and N×K ports bidirectionally, each point communicating with a respective trunk; and
  a plurality N of switching modules $S_1$ to $S_N$, each connected to a plurality K of said ports, said switching module being a packet router.

* * * * *